May 15, 1956 J. W. FRIED ET AL 2,745,299

DEBURRING AND CHAMFERING TOOL

Filed Sept. 21, 1953

JOSEPH W. FRIED
ARMIN FRIED
INVENTOR.

BY Hazard & Miller

ATTORNEYS

United States Patent Office 2,745,299
Patented May 15, 1956

2,745,299

DEBURRING AND CHAMFERING TOOL

Joseph W. Fried and Armin Fried, Burbank, Calif.

Application September 21, 1953, Serial No. 381,246

7 Claims. (Cl. 77—73.5)

This invention relates to improvements in deburring and chamfering tools. It may be regarded as an improvement over the constructions disclosed in our copending applications Serial Nos. 185,964, filed September 21, 1950, and 220,648, now U. S. Pat. 2,706,421, filed April 12, 1951.

A primary object of the present invention is to provide an improved chamfering and deburring tool wherein there is a spindle adapted to be chucked in the drill chuck of a drill press, drill motor, or the like, and wherein there is a cutter pivotally mounted on the spindle so that it may optionally assume a position wholly disposed within the contour of the spindle or a cutting position wherein one or more cutting edges on the cutter pivot laterally beyond the spindle. These cutting edges are so arranged that one cutting edge may chamfer or remove burrs around the forward end of a hole drilled through a workpiece and the other cutting edge may similarly chamfer or remove burrs around the rear end of the same hole as the pilot on the spindle is withdrawn from the hole. In this manner both ends of the hole through the workpiece may be chamfered or have burrs removed around its edges during a single pass of the pilot into the hole and its withdrawal therefrom. It is desirable to have the rear cutter which chamfers or removes burrs around the rear end of the hole operable to automatically retract when a predetermined resistance pressure has been encountered thereby so that the chamfer cut on the work around the rear end of the hole will automatically be cut to a predetermined depth, and when such depth has been cut the tool will automatically return to a position wherein it can be withdrawn from the hole and cutting operations are discontinued. In this manner, with a given setting of the tool the chamfers cut on a series of holes in the same workpiece will be quite uniform.

As the resistance pressure which automatically discontinues the cutting of the rear chamfer varies with different materials, it is a further object of the invention to provide a construction having the above-mentioned characteristics in which adjustment is possible to meet the resistance pressure of various material in which the tool may be used.

With the foregoing and other objects in view, which will be made manifest in the following detailed description and specifically pointed out in the appended claims, reference is had to the accompanying drawings for an illustrative embodiment of the invention, wherein:

Figure 1:
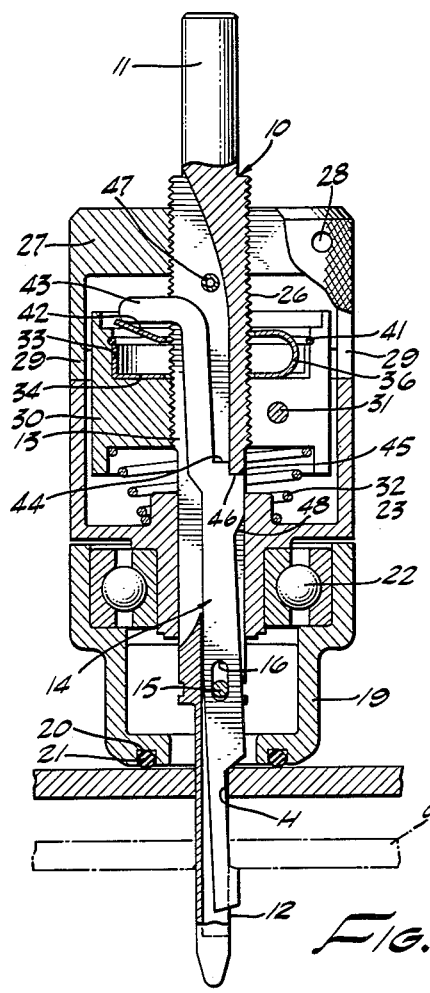
Figure 1 is a vertical section through the improved tool showing the cutter in its retracted position within the spindle and in a position wherein the pilot on the spindle may be introduced into or withdrawn from a hole in a workpiece.

Referring to the accompanying drawings wherein similar reference characters designate similar parts throughout, the improved tool comprises a spindle 10 having its upper end 11 shaped so that it may be chucked in the chuck of a drill press, drill motor, or the like to rotate the spindle about its vertical central axis. The lower end of the spindle is reduced in diameter to provide a pilot 12 of a diameter such that it may pass through a hole in a workpiece W. The spindle is longitudinally slotted as at 13 to accommodate a blade-like cutter 14 which is pivoted in the slot by means of a pivot pin 15. The pivot pin 15 extends through an elongated slot 16 in the cutter so that the cutter may not only pivot relatively to the spindle but it also has a limited sliding movement relatively thereto in an axial direction. On the cutter there are two cutting edges 17 and 18 which are opposed to each other, the cutting edge 17 being designed to chamfer or remove the burrs around the forward end of the hole H and the rear cutting edge 18 being designed to chamfer or remove burrs around the rear end of the hole H as the pilot is withdrawn through the hole.

Around the spindle there is a skirt 19 which is preferably recessed as at 20 to accommodate a resilient ring 21. This ring is designed to engage the forward face of the workpiece W without marring it. The skirt 19 has an anti-friction thrust bearing 22 disposed therein and a sleeve 23 has its hub portion fitting between the spindle and the inner race of the thrust bearing 22.

The upper portion of the spindle 10 is formed with opposed flats 24 and 25, and between these flats the spindle is provided with partial threads 26. A cap 27 is internally threaded with threads complementary to the partial threads on the spindle and is radially split so that it may be optionally loosened and screwed either up or down on the spindle and locked in adjusted position by means of a set screw 28 that is threaded into the cap and extends across the radial split. On tightening the set screw 28 the sides of the split in the cap are drawn together to contract the cap about the threaded portion of the spindle.

The cap has downwardly extending legs 29 arranged on diametrically opposite sides thereof which are engageable with the top of the sleeve 23 to limit the distance that the spindle may move axially through the sleeve 23. Consequently, the adjustment of the cap 27 regulates or governs the amount of advancement of the cutting edge 17 relative to the skirt 19 and in this manner, the depth of cut capable of being made by the cutting edge 17 is controlled. As the cutting edge 17 must be ground back in the course of re-sharpening from time to time, it is apparent that this may be compensated for by re-adjusting the cap 27 axially along the length of the spindle 10.

Between the cap 27 and the sleeve 23 there is a nut 30 having internal threads complementary to the threads 26 on the spindle. This nut is likewise radially split and is capable of being contracted on the spindle to lock the nut in adjusted position by a set screw 31 which is threaded into the nut and which extends across the split.

Figure 2:
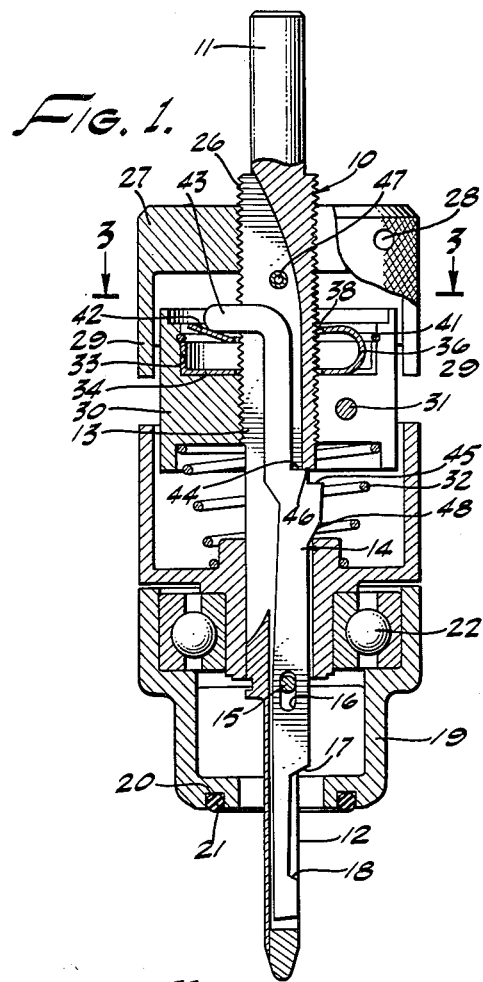
Fig. 2 is a view similar to Fig. 1, but illustrating the cutter in its projected or cutting position.
Figure 3:
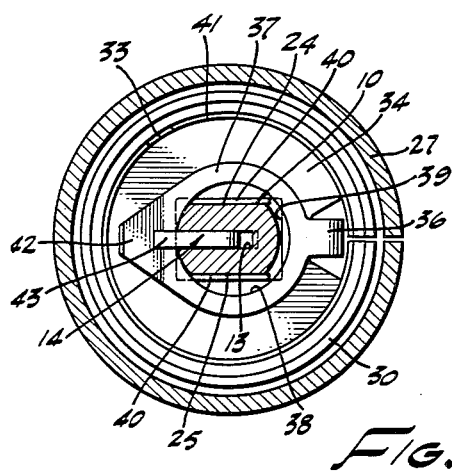
Fig. 3 is a horizontal section taken substantially upon the line 3—3 upon Fig. 1.
Figure 4:
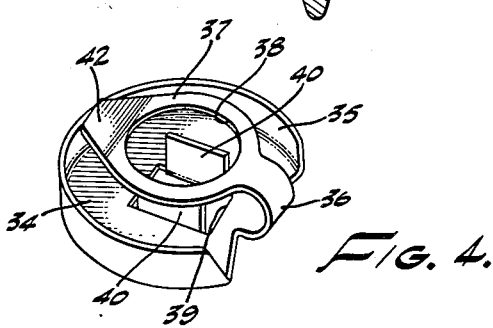
Fig. 4 is a perspective view of one of the springs employed as part of the tool.

The nut 30 provides on its under side a spring seat for a limber compression spring 32. This compression spring is also seated on the sleeve 23. It normally urges the spindle into its uppermost position relatively to the skirt 19 and the sleeve 23. The uppermost position is limited by the engagement of the pivot pin 15 with the hub of the sleeve 23. When the spindle is forced downwardly relative to the skirt 19 and the sleeve 23 the compression spring 32 merely compresses as illustrated in Fig. 2. The top of the nut 30 is recessed as indicated at 33 to receive a spring as illustrated in Fig. 4. This spring consists of a bottom plate 34 having an upstanding marginal rim 35. A portion of the bottom plate is bent upwardly forming a reverse bend as illustrated at 36 and an upper or overlying portion 37. The portion 37 has an aperture 38 therein through which the spindle slidably extends. In the bottom plate and in alignment with the aperture 38 there is a rectangular opening 39 at the sides of which there are upstanding flanges 40. The spacing between the flanges 40 is equal to the spacing between the flats 24 and 25 on the spindle so that in effect the spring is slidably keyed on the spindle and is held against rotation relatively thereto during rotation of the nut 30.

The spring is retained in its recess 33 by a split expansion ring 41 that is partially recessed in the walls of the cavity. The upper or overlying portion 37 of the spring terminates in an upwardly inclined lip 42 that is arranged opposite the slot 13 so as to be engageable by the laterally extending finger 43 on the cutter 14. The lip 42 on the spring performs two functions. It urges the cutter 14 in an upward direction or in an axial direction with respect to the spindle, but it also functions as a cam to cam the cutter and cause it to pivot on its pivot pin 15 from the position shown in Fig. 2 to the position shown in Fig. 1.

On the cutter there is a stepped shoulder having two steps 44 and 45, and on the spindle there is an opposed shoulder 46 that may be engaged by either of the steps 44 or 45. Thus, as shown in Fig. 1, the step 44 is in engagement with the shoulder 46, but as shown in Fig. 2, the shoulder 46 is opposed by the step 45. 47 is a pin which extends diametrically through the spindle between the cap 27 and the nut 30 to limit adjustment of the cap and of the nut 30 along the length of the spindle. 48 is a cam surface on the cutter engageable with the hub of the sleeve 23 that will cam the cutter, causing it to pivot relatively to the spindle from the position shown in Fig. 1 to the position shown in Fig. 2.

The operation of the above-described construction is substantially as follows:

With the tool in the position shown in Fig. 1, the cutting edge 18 is disposed entirely within the pilot of the spindle, and in this position the pilot may be introduced into the hole H. As the spindle is advanced toward the work W the skirt 19 has its resilient ring 20 engage the forward face of the work arresting advancing movement of the skirt 19 and the sleeve 23. The spindle 10 thereafter slides or telescopes through the sleeve 23 and the skirt 19 advancing the forward cutting edge 17 toward the forward edge of the hole H. During the advancing movement of the spindle 10 relatively to the arrested skirt 19 and sleeve 23, the cam 48 on the cutter engages the hub of the sleeve 23 causing the cutter to swing from the position shown in Fig. 1 to the position shown in Fig. 2. As the spindle continues to advance toward the work the cutting edge 17 ultimately engages the forward edge of the hole H and as the spindle is rotated this cutting edge cuts the chamfer and removes any burrs that may be around the forward end of the hole. The depth of cut made by the cutting edge 17 is limited by the engagement of the feed 29 with the top edge of the sleeve 23. It will be noted that as the cam 48 shifts the cutter from the position shown in Fig. 1 to the position shown in Fig. 2, that the step 44 has disengaged the shoulder 46. Consequently, the spring-actuated lip 42 can lift the cutter relatively to the spindle until the shoulder 46 is engaged by the step 45. The spring on which the lip 42 is mounted may consequently be regarded as being in its expanded position when this occurs as is depicted in Fig. 2.

When the cut made by the cutting edge 17 has been completed the spindle is then slowly withdrawn from the hole and during the withdrawal movement the cutting edge 18 which still is in its projected position with relation to the pilot is brought into engagement with the rear edge of the hole H. As the rotation of the spindle continues this cutting edge will cut its chamfer on the rear edge of the hole, but as the cutting proceeds, it will be appreciated that the cutting edge 18 must progressively traverse a wider and wider surface. This progressively increasing surface affords a greater and greater resistance to penetration by the cutting edge 18. Consequently, if the spindle is withdrawn at a uniform rate there will ultimately be a condition wherein the cutting edge 18 is not penetrating the workpiece W as rapidly as the spindle is withdrawn. When this occurs the cutter 14 is pulled downwardly relatively to the spindle causing the finger 43 to depress the lip 42. When the cutter 14 has been pulled downwardly a sufficient distance so that the step 44 is lower than the shoulder 46, the lip 42 functions as a cam automatically returning the cutter 14 from the position shown in Fig. 2 to the position shown in Fig. 1, and positioning the step 44 beneath the shoulder 46. Consequently, when the cutter is returned by the lip 42 to the position shown in Fig. 1, it will be retained in this position during further withdrawal of the pilot from the hole H.

It will be readily apparent that the resistance to penetration by the cutting edge 18 will vary with different materials. Thus, in a relatively soft material such as aluminum, the cutting edge 18 will penetrate much deeper and make a much deeper cut than if the workpiece W is formed of steel. Consequently, it is necessary to adjust the tool to meet the requirements of different materials.

If the set screw 31 is loosened and the nut 30 is adjusted upwardly with relation to the spindle, this causes the spring on which the lip 42 is mounted to be compressed to a greater extent. Consequently, under these circumstances the resistance to penetration by the cutting edge 18 must be greater before the tension imposed on the cutter is sufficient to depress the lip 42 a sufficient distance to enable the step 44 to pass beneath the shoulder 46. Conversely, if the nut 30 is adjusted downwardly with relation to the spindle so that the spring for the lip 42 is highly expanded only a small amount of resistance to penetration by the cutting edge 18 is required to depress the lip 42 the necessary distance to position the step 44 beneath the shoulder 46. The cap 27 and the sleeve 23 are normally in spaced relation to each other as illustrated in Fig. 1, so that the set screw 31 is readily available to loosen the nut 30 and permit it to be adjusted with relation to the spindle. Consequently, in the improved tool by adjusting the position of the nut 30 the depth of cut made by the cutting edge 18 can be regulated or controlled. When the cut made by the cutting edge 18 is sufficiently deep so that reactionary pressure on this cutting edge is sufficient to clear the step 44 with the shoulder 46, the cutter is instantly and automatically returned to the position shown in Fig. 1, and the pilot on the spindle can then be readily withdrawn from the hole.

From the above described construction it will be appreciated that an improved chamfering and deburring tool has been provided wherein the rear cutter which cuts the rear end of the hole is automatically returned to its retracted position as a direct function of resistance to penetration by this cutter. Furthermore, the point or pressure at which the rear cutter is retracted is adjustable or variable to meet various conditions created by the use of workpieces of different materials.

Various changes may be made in the details of construction without departing from the spirit and scope of the invention as defined by the appended claims.

We claim:

1. A chamfering and deburring tool comprising a spindle, a cutter pivotally mounted upon the spindle having a cutting edge adapted to be projected laterally from the spindle or assume a retracted position relatively thereto, means for causing the cutter to assume a position wherein its cutting edge is projected, means responsive to the pressure on the cutting edge exceeding a predetermined degree for causing the cutter to return to its retracted position and be retained in its retracted position, and means for varying the last-mentioned means whereby the pressure at which the cutter is returned may be varied.

2. A chamfering and deburring tool comprising a spindle, a cutter pivotally mounted thereon and having a limited movement in an axial direction relatively thereto, a nut adjustable along the length of the spindle, spring means between the nut and the cutter urging the cutter to one extreme of its movement in said axial direction, and means axially movable relatively to the spindle for pivoting the cutter relatively to the spindle whereby when the cutter is pivoted its cutting edge will project laterally beyond the spindle and when the cutter is subjected to pressure urging it toward the other end of its axial movement with sufficient pressure to overcome the spring the cutter will be returned to a position wherein its cutting edge will be retracted.

3. A chamfering and deburring tool comprising a spindle, a cutter pivotally mounted thereon and having a limited sliding movement relatively thereto, a spring cam on the spindle engaging a portion of the cutter urging the cutter longitudinally of the spindle and urging the cutter to pivot relatively thereto in one direction, a cam on the cutter, and means telescopically mounted on the spindle engageable with the work and with said cam for pivoting the cutter relatively to the spindle in the opposite direction.

4. A chamfering and deburring tool comprising a spindle, a cutter pivotally mounted thereon and having a limited sliding movement relatively thereto, a spring cam on the spindle engaging a portion of the cutter urging the cutter longitudinally of the spindle and urging the cutter to pivot relatively thereto in one direction, a cam on the cutter, means telescopically mounted on the spindle engageable with the work and with said cam for pivoting the cutter relatively to the spindle in the opposite direction, a shoulder on the spindle, and a stepped shoulder on the cutter, the steps of which are engageable with the shoulder on the spindle.

5. A chamfering and deburring tool comprising a spindle, a cutter pivotally mounted upon the spindle and capable of a limited sliding movement axially of the spindle, a sleeve telescopically arranged about the spindle, a skirt rotatably mounted on the sleeve, a cam on the cutter, means on the sleeve engageable with the cam for pivoting the cutter relatively to the spindle to project a cutting edge on the cutter laterally beyond the spindle, a nut threaded onto the spindle, a spring cam mounted on the nut engageable with the cutter urging the cutter into a position wherein its cutting edge is retracted within the spindle, a shoulder on the spindle, and a stepped shoulder on the cutter, the steps of which are engageable with the shoulder on the spindle.

6. A chamfering and deburring tool comprising a spindle, a cutter pivotally mounted upon the spindle and capable of a limited sliding movement axially of the spindle, a sleeve telescopically arranged about the spindle, a skirt rotatably mounted on the sleeve, a cam on the cutter, means on the sleeve engageable with the cam for pivoting the cutter relatively to the spindle to project a cutting edge on the cutter laterally beyond the spindle, a nut threaded onto the spindle, a spring cam mounted on the nut engageable with the cutter urging the cutter into a position wherein its cutting edge is retracted within the spindle, a shoulder on the spindle, a stepped shoulder on the cutter, the steps of which are engageable with the shoulder on the spindle, and a cap threadedly mounted on the spindle engageable with the sleeve for limiting axial movement of the spindle relatively to the sleeve.

7. A chamfering and deburring tool comprising a spindle, a cutter pivotally mounted upon the spindle and capable of a limited sliding movement axially of the spindle, a sleeve telescopically arranged about the spindle, a skirt rotatably mounted on the sleeve, a cam on the cutter, means on the sleeve engageable with the cam for pivoting the cutter relatively to the spindle to project a cutting edge on the cutter laterally beyond the spindle, a nut threaded onto the spindle, a spring cam mounted on the nut engageable with the cutter urging the cutter into a position wherein its cutting edge is retracted within the spindle, a shoulder on the spindle, a stepped shoulder on the cutter, the steps of which are engageable with the shoulder on the spindle, and spring means between the sleeve and the nut urging the spindle in an axial direction relatively to the sleeve.

References Cited in the file of this patent
UNITED STATES PATENTS

| | | |
|---|---|---|
| 2,620,689 | Cogsdill | Dec. 9, 1952 |
| 2,663,203 | Fried et al. | Dec. 22, 1953 |